United States Patent [19]

Distenfeld

[11] 4,100,414
[45] Jul. 11, 1978

[54] METHOD FOR MEASURING DOSE-EQUIVALENT IN A NEUTRON FLUX WITH AN UNKNOWN ENERGY SPECTRA AND MEANS FOR CARRYING OUT THAT METHOD

[75] Inventor: Carl H. Distenfeld, Mattituck, N.Y.

[73] Assignee: The United States of America as represented by the United States Department of Energy, Washington, D.C.

[21] Appl. No.: 760,796

[22] Filed: Jan. 19, 1977

[51] Int. Cl.² ........................... G01T 3/00; G01T 1/11
[52] U.S. Cl. .................................. 250/391; 250/337; 250/484
[58] Field of Search ............... 250/472, 473, 484, 390, 250/391, 392

[56] References Cited

U.S. PATENT DOCUMENTS 3,699,337  10/1972  Hoy ........................................ 250/484

*Primary Examiner*—Davis L. Willis
*Attorney, Agent, or Firm*—Dean E. Carlson; Leonard Belkin

[57] ABSTRACT

A method for measuring the dose-equivalent for exposure to an unknown and/or time varing neutron flux which comprises simultaneously exposing a plurality of neutron detecting elements of different types to a neutron flux and combining the measured responses of the various detecting elements by means of a function, whose value is an approximate measure of the dose-equivalent, which is substantially independent of the energy spectra of the flux. Also, a personnel neutron dosimeter, which is useful in carrying out the above method, comprising a plurality of various neutron detecting elements in a single housing suitable for personnel to wear while working in a radiation area.

13 Claims, 4 Drawing Figures

S/TIP OR $\frac{100 \, BCd}{(TIP-BCd)}$

METHOD FOR MEASURING DOSE-EQUIVALENT IN A NEUTRON FLUX WITH AN UNKNOWN ENERGY SPECTRA AND MEANS FOR CARRYING OUT THAT METHOD

BACKGROUND OF THE INVENTION

This invention was made under, or in the course of a contract with the U.S. Energy Research and Development Administration.

No known neutron detectors or series of detectors in personnel neutron dosimeters correctly measure dose-equivalent without a prior knowledge of the energy spectra of the neutron flux to be measured. Useful dosimeter performance is obtained by calibrating dosimeters for the exposure spectra.

Prior to this invention the best method used for personnel neutron dosimetry which did not require a prior knowledge of the energy spectra was the method previously developed by the inventor utilizing two known neutron detecting means, a thorium damage track neutron detector and an unshielded thermoluminescent neutron detector, described in "Development Study of Personnel Neutron Dosimetry at the AGS", BNL #17452, Brookhaven National Laboratory, dated Dec. 12, 1972, by Carl Distenfeld and Joseph R. Klemish, available from the National Technical Information Service (NTIS) 5285 Port Royal Road, Springfield, Virginia 22151. This prior method, however, does not properly measure the contribution to dose equivalent made by neutron having energies less than about one MeV.

SUMMARY OF THE INVENTION

This invention substantially overcomes the problems described above by means of a method for measuring the dose equivalent accumulated due to an exposure to a neutron flux having an unknown and/or time varying energy spectra comprising the steps of obtaining a first reading reflecting substantially only incident neutrons having energies in an upper portion of the energy spectrum, obtaining a second reading reflecting both incident neutrons and backscattered neutrons from the user's torso (Albedo neutrons) both having energies in a lower portion of the energy spectrum and obtaining a third reading reflecting substantially only those incident neutrons having energies in said lower portion of the energy spectrum. By backscattered herein is meant scattered or reflected from the dosimeter user's torso, usually termed Albedo fluence, so as to have a substantial component of velocity after scattering or reflecting opposite to the initial velocity. By upper portion of the energy spectrum herein is meant a substantial range of energy values above a certain value and by lower portion herein is meant a substantial range of detectable energy values below said certain level. In the preferred embodiment described herein said certain level is about one MeV. The readings so obtained are then combined by means of a function of said readings to provide an approximate measure of the dose equivalent accumulated due to the incident flux during the period of exposure which is substantially independent of the energy spectra of the incident flux.

Such a function may be developed by comparing the responses for known exposures of each type of neutron detecting means to the known dose equivalent of a number of known spectra. Such comparisons may best be carried out by means of computer simulation of the various responses for appropriate and diverse exposure spectra. Having this information a person skilled in the art of dosimetry will be able to find a function or functions of all the various responses, whose value is an approximate measure which is substantially independent of energy spectra, of the dose equivalent.

The back shielded neutron detecting means is a novel neutron detecting means, developed to be used in this method, which comprises a neutron detecting means sensitive to neutrons having energies less than about one MeV and a shield means between the neutron detecting means and the wearer's body which serves to substantially absorb neutrons backscattered from the wearer's body. This novel neutron detecting means is combined with the thorium track damage neutron detecting means and the unshielded neutron detecting means in a single housing to insure that all three elements are uniformly exposed to the same neutron flux.

It is thus a principle object of this invention to provide an improved method for monitoring or measuring doseequivalent for personnel exposed to unknown and/or time varying neutron flux, with improved response to neutrons having less than about one MeV energy, and to provide a personnel neutron dosimter useful in carrying out said method.

Further objects and advantages of the invention will become apparent from the following description of a preferred embodiment of the invention.

Figure 1:
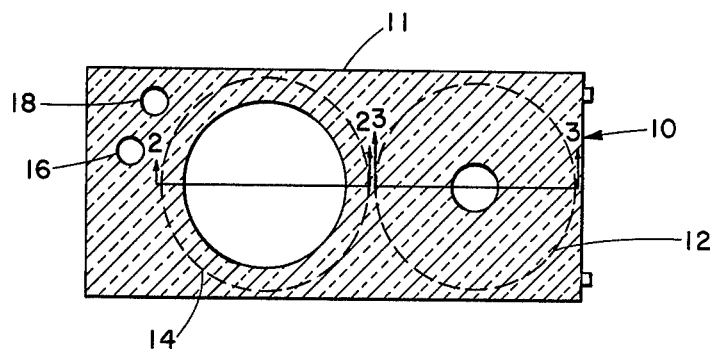
FIG. 1 is a plan view of a section through a composite personnel neutron dosimeter showing the position of the various neutron detecting means.

DETAILED DESCRIPTION OF THE INVENTION:

Referring to FIG. 1 the composite personnel neutron dosimeter badge 10 consists of a body 11 containing a backshielded thermoluminescent neutron detecting assembly 12, a thorium damage track neutron detecting assembly 14 and unshielded thermoluminescent neutron detecting elements 16 and 18. Thermoluminescent element 16 is substantially pure $^7$LiF and thermoluminescent element 18 is substantially pure $^6$LiF. Suitable such material is well known in the art and is available commercially. These materials are also used in the backshielded thermluminescent detector 12. The body 11 of the dosimeter 10 is plastic and has a shielding effect that is negligible for neutron dosimtery.

All the detectors are held within body 11 of the badge 10 by filler plugs of plastic (not shown) where needed, between the detectors and a back cover (not shown). The back cover and filler plugs also have a negligible shielding effect for neutron dosimtery. The badge is worn by a clip (not shown) attached to the back cover.

Figure 2:
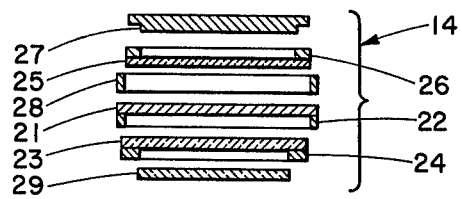
FIG. 2 is an exploded detail cross section view along 2—2 of the thorium damage track neutron detecting assembly.

Referring to FIG. 2 the thorium-track damage neutron detecting assembly 14 consists of a thorium 232, foil 21 held smooth by the ring 22. Two polycarbonate detector foils 23, 25 are held smooth by rings 24, 26 respectively. Foil 23 is positioned in front of and foil 25 is positioned behind the thorium foil 21. The three foils are held in uniform contact by the compression cover 27 and the split ring 28. An optional backup polycarbonate foil 29 may be placed under foil 23 to extend the range of the thorium damage track detector. The polycarbonate foils 23, 25, 29 may suitably be formed from commercially available material, well known in the art.

Figure 3:
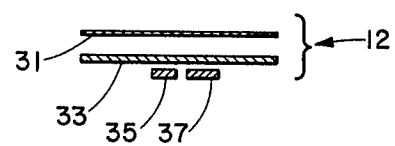
FIG. 3 is an exploded detail cross section view along 3—3 of the backshielded thermoluminescent neutron detecting assembly.

FIG. 3 shows an exploded cross section of the backshielded thermoluminscent neutron detector assembly 12. The cadmium disk 31 is sufficiently thick enough to absorb substantially all backscattered neutrons having energies less than about one eV. An optional copper disk 33 is added to shield the LiF foils from capture gammas from the cadmium. The $^6$LiF foil 35 and the $^7$LiF foil 37 are held in place beneath the cadmium and copper shields 31, 33 by a recess in the body 11 of the badge 10.

In using the method of this invention the badge is worn by the personnel to be monitored for a predetermined period of time. During this time neutrons having energies greater than about 1 MeV incident on the Thorium 232 foil 21 cause thorium atoms to fission. The fission fragments cause a number of damage tracks in the detector foils 23, 25 and in the backup foil 29 that is essentially proportional to the number of neutrons. The backup foil 29 is shielded by the detector foil 23 so that its response is attenuated by a factor of approximately 50 from the response of the detector foils 23, 25.

At the end of the predetermined period, the detector foils 23, 25, 29 are removed and after appropriate chemical etching to develop the damage tracks into holes, are read by a spark detection method basically well known to those skilled in the art.

Beyond a certain range of exposure the response of the detector foils is no longer linear with dose equivalent. For exposures beyond this range the backup foil 29 may be read by the above method and the value obtained multiplied by the attenuation factor of approximately 50 to obtain readings for high dosages such as those caused by accidents. As the method of this invention is hereinafter described it is to be understood that the properly scaled reading from the backup foil 29 may be used when appropriate to extend the range of the dosimeter.

For exposure in the anticipated range the value obtained from either of the foils 23, 25 may be used with the other serving as a check for anomalous readings or the two readings can be arithimetically averaged.

During the time the badge is worn radiation incident on the unshielded LiF foils 16, 18 and on the backshield LiF foils 35, 37 cause energy to be stored in damage centers in the LiF materials. This energy has a functional relationship to the dose-equivalent of the radiation incident on the LiF material. This energy is released as photons when the LiF is heated. Thus, the thermoluminescent foils may be read by a method which is basically well known to those skilled in the art. The LiF foils 16, 18, 35, 37 are separately read in a commercially available integrating reader. Since $^7$LiF is substantially less sensitive to neutrons than $^6$LiF the difference between the normalized reading for the unshielded $^6$LiF foil 18 and the unshielded $^7$LiF foil 16 is taken as the unshielded neutron response and the difference between the normalized reading for the backshielded $^6$LiF foil 35 and the backshielded $^7$LiF foil 37 is taken as the backshielded neutron response.

In the practice of this embodiment of the invention the neutron responses obtained as described above are combined in the following expression to obtain a measure of the dose equivalent.

$$D = K \cdot S + K_1(S, T1P, BCd) \cdot T1P$$

Where:
D is the dose equivalent
K is a constant chosen to reflect the area of the damage track detector foils and the maximum neutron energy anticipated. (Methods for choosing values of K are well known to those skilled in the art.)
S is the damage track neutron response
T1P is the normalized unshielded thermoluminescent neutron response
BCd is the normalized backshielded thermoluminescent neutron response and:
$K_1(S, T1P, BCd) =$
$f(T1P/S)$ ; T1P/S in a lower range of values
$\frac{1}{2}f(T1P/S) + \frac{1}{2}f(100\ BCd/(T1P-BCd))$; T1P/S in the middle range of values
$f(100\ BCd/T1P-BCd))$ ; T1P/S in a higher range of values
where $f$ is a non-linear function developed by computer simulation of the responses of the various neutron detecting means to hypothetical neutron spectra using computer techniques known to those skilled in the art. Appropriate techniques are more fully described in "Improvements and Tests of the Bonner Multisphere Spectrometer", BNL #21293, Brookhaven National Laboratory Informal Report by Carl H. Distenfeld, available from NTIS.

It will be obvious to those skilled in the art that other functions of a different form can be found which will map the responses S, T1P and BCd onto an approximate measure of dose equivalent, and that different embodiments of the invention can be developed by changing the geometry or materials of the various detector means.

EXAMPLE:

The following example illustrates the application of the invention to spectra having maximum energies less than 15 MeV.

Thermoluminescent elements 16 and 35 are formed from a material sold by the Harshaw Chemical Company under the trademark TLD 600.

Thermoluminescent elements 17 and 36 are formed from a material sold by the Harshaw Chemical Company under the trademark TLD 700.

The body 11 of the dosimeter has a thickness of approximately 200 milligrams/centimeter$^2$ in front of the detectors.

The thorium foil 21 has a thickness of approximately 5 milligram/centimeter$^2$.

The polycarbonate foils 23, 25, 29 are approximately 10 microns thick and formed from the material sold under the trademark Kimfol.

The cadmium disk 31 is approximately 0.03 inches thick and the copper disk 33 is approximately 0.04 inches thick.

The etched damage track foils are read using the following procedure. The foils 23, 25, 29 are first etched in 6N KOH at 65° C for 75 minutes. Moderate mechanical stirring improves etching uniformity of foils 23, 25 and serves to prevent adhesion of the foils 29. The foils 23, 25, 29 are then washed in distilled water for 15 minutes and oven dried at 100° C for 15 minutes. After drying, at least one hour is allowed for the foils 23, 25, 29 to return to room ambient conditions.

The foils 23, 25, 29 are then separately placed between an extended anode and an extended cathode. The anode and cathode are each held in uniform contact with essentially the whole area of one side of the foils 23, 25, 29 by a pressure of approximately 22.4 grams/centimeter$^2$. The cathode surface comprises an aluminum foil, less than 0.1 micron thick. When a voltage of approximately 1060 volts dc is applied between the anode and cathode sparking occurs through the holes in the detector foils 23, 25, 29. As a spark passes through each hole in the detector foils 23, 25, 29 a small area of the thin aluminum cathode beneath that hole is evaporated, ending the spark. After sparking at approximately 1060 volts the cathode foil is replaced and the foils 23, 25, 29 are sparked again at a voltage of approximately 560 volts dc. As the voltage is applied the least resistive hole in the foils 23, 25, 29 will spark first. The power supply is so designed that this spark causes the voltage to drop thus inhibiting sparking at other holes. When the thin aluminum cathode is evaporated beneath the hole the spark ends allowing the voltage to rise until another hole sparks. Thus, there is a sequence of sparks which may be counted. The number obtained is essentially equal to the number of holes. This number is taken as the track damage neutron response.

The 560 volt potential is applied by a second anode which is slightly smaller than the first so that it may be more surely positioned in the area which has been sparked first.

Beyond a certain range of exposure the response of the detector foils is no longer linear with dose equivalent. For exposures beyond this range the backup foil 29 may be read by the above described method and the value obtained multiplied by the attenuation factor of approximately 50 to obtain readings for high dosages such as those caused by accidents. As this example is hereinafter described it is to be understood that the properly scaled reading from the backup foil 29 may be used when appropriate to extend the range of the dosimeter.

Occasionally the aluminum evaporated from the cathode will form a short circuit between the anode and cathode. To avoid erroneous readings from this cause the power supply used in this example is provided with means to detect such short circuits.

The thermoluminescent elements are read using the following procedure. The LiF foils 16, 18, 35, 37 are separately read in a commercially available integrating reader sold under the trademark of Eberline TLR-5. The foils 16, 18, 35, 37 are first heated to a temperature of approximately 160° C for approximately 10 seconds. The temperature is then rapidly increased to a temperature of 285° C for a second period of 10 seconds. During this second period photons emitted by the LiF are captured by a photomultiplier tube. The integrated output of the photomultiplier tube is taken as the output reading. The output readings are normalized by expressing them in terms of an equivalent cobalt 60 exposure. Since $^7$LiF is substantially less sensitive to neutrons than $^6$LiF the difference between the normalized reading for the unshielded $^6$LiF foil 18 and the unshielded $^7$LiF foil 16 is taken as the unshielded neutron response and the difference between the normalized readings for the backshielded $^6$LiF foil 35 and the backshielded $^7$LiF foil 37 is taken as the backshielded neutron response.

In the practice of this example the neutron responses obtained as described above are combined in the following expression to obtain a measure of the dose equivalent. The assumption is made that the energy spectra is limited to a maximum energy of 15 MeV.

$$D = K \cdot S + K(S, T1P, BCd) \cdot T1P$$

Where:
D is the dose equivalent
K is a constant equal to 7.1 (this value reflects a sparked area of approximately 4.4 centimeters$^2$ and a maximum energy of 15 MeV.)
S is the damage track neutron response
T1P is the normalized unshielded the moluminescent neutron response
BCd is the normalized backshielded thermoluminescent neutron response and:
$K_1(S, T1P, BCd) =$
$f(T1P/S)$ ; T1P/S < 15
$\frac{1}{2} f(T1P/S) + \frac{1}{2} f(100 \, BCd/T1P\text{-}BCd); 15 \leq T1P/S < 20$
$f(100 \, BCd/T1P\text{-}BCd))$ ; T1P/S $\geq$ 20
where $f$ is the non-linear function illustrated by FIG. 4.

Figure 4:
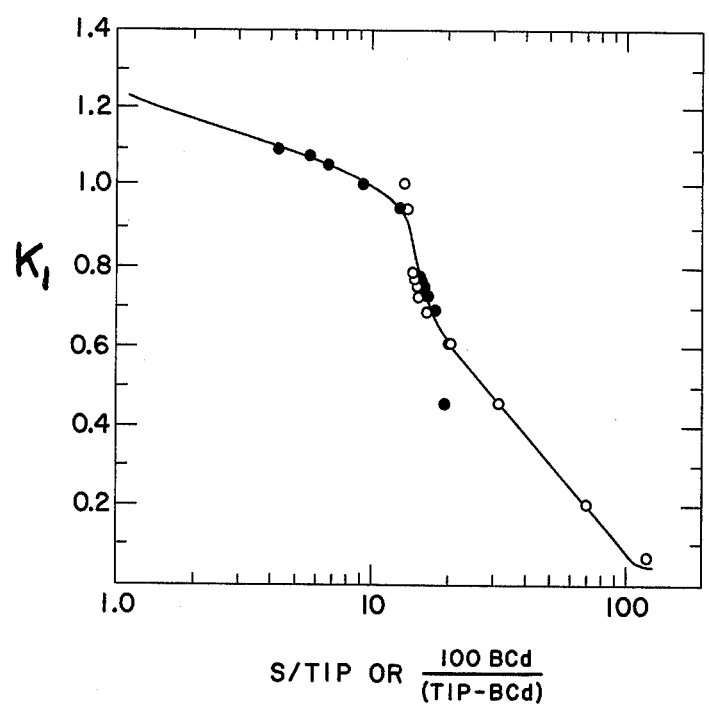
FIG. 4 is an illustration of a non-linear function of ratios of readings taken vs a correction factor for use in the subject invention.

The function f was developed by computer simulation of the responses of the various neutron detecting means to 15 hypothetical neutron spectra using computer techniques known to those skilled in the art. The dose equivalent was found for each of the hypothetical spectra and a correction factor $K_1$ $$K_1 = (D - K \cdot S)/T1P$$

was plotted against both T1P/S, solid points in FIG. 4, and 100 BCd/(T1P - BCd), open points in FIG. 4. The curve defining the function f was developed by fitting, by eye, a smooth curve to the solid points for T1P/S < 15 to the open points for T1P/S > 20 and to the midpoint, between corresponding points for 15 $\leq$ T1P/S < 20.

Other examples could be developed. In particular, the cadmium and copper shields 31, 33 may be replaced by shields of 3/16 inch 30% borated rubber and a paper shield or the thorium may be replaced by neptunium 237 as a source of fission fragments, though the increased hazards of neptumium 237 may make it unacceptable for use in a personnel dosimeter. If such substitutions were made new functions would have to be developed.

What is claimed is:

1. A method for measuring the dose-equivalent accumulated by a person during a period of exposure to a neutron flux having an unknown and/or time varying energy spectrum comprising the steps of:
   (a) Obtaining a first reading reflecting substantially only that portion of said neutron flux, incident during said periods of exposure, having energies in an upper portion of said energy spectrum,
   (b) Obtaining a second reading reflecting both that portion of said flux incident during said periods of exposure and those neutrons backscattered from said person's body during said periods, having energies in a lower portion of said energy spectrum,
   (c) Obtaining a third reading reflecting substantially only that portion of said flux, incident during said periods, having energies in said lower portion of said energy spectrum, (d) Combining said readings by means of a predetermined function of said readings whose value is an approximate measure of the dose equivalent accumulated by said person during said periods which value is substantially independent of said energy spectrum.

2. The method of claim 1 wherein said upper portion of said energy spectrum consists of energies above approximately one MeV and said lower portion of said energy spectra consists of detectable energies below approximately one MeV.

3. The method of claim 2 wherein said third reading is obtained from neutron detecting means sensitive to neutrons in said lower portion of said energy spectrum by substantially shielding said means from neutrons backscattered from said person's body.

4. The method of claim 3 wherein said shielding reduces the effect of said backscattered neutrons having energies less than 0.5 eV by a factor of approximately ten thousand.

5. The method of claim 4 wherein said function has the form:

$$D = KS + K_1(S, T1P, BCd)T1P$$

where:
D is the dose equivalent
S is said first reading
T1P is said second reading
BCd is said third reading and:
K is a constant.

6. The methods of claim 3 wherein said function has the form:

$$D = KS + K_1(S, T1P, BCd)T1P$$

where:
D is the dose equivalent
S is said first reading
T1P is said second reading
BCd is said third reading and:
K is a constant.

7. The method of claim 1 said third reading is obtained from neutron detecting means sensitive to neutrons in said lower portion of said energy spectrum by substantially shielding said means from neutrons backscattered from said person's body.

8. The method of claim 7 wherein said function has the form:

$$D = KS + K_1(S, T1P, BCd) T1P$$

where:
D is the dose equivalent
S is said first reading
T1P is said second reading
BCd is said third reading and:
K is a constant.

9. A dosimeter to be worn by persons exposed to neutron radiation comprising:
  a. A housing which is substantially transparent to neutron radiation;
  b. Neutron detecting means sensitive to neutrons having energies less than one MeV contained within said housing, so that said detecting means are exposed to a substantially unmodified flux of said neutron radiation;
  c. Shielding means arranged between said neutron detecting means and the body of said wearer so as to absorb a significant portion of the neutrons backscattered from said wearer's body.

10. A dosimeter as claimed in claim 9 wherein said neutron detecting means comprises a first thermoluminescent detecting element of substantially pure $^7$LiF and a second thermoluminescent element of substantially pure $^6$LiF.

11. A dosimeter as claimed in claim 10 wherein said shielding means comprises a borated rubber shield.

12. A dosimeter as claimed in claim 10 wherein said shielding means comprises a cadmium shield.

13. A dosimeter as claimed in claim 12 further comprising:
  (a) a thorium damage track neutron detecting means and
  (b) A third neutron detecting means comprising a third thermoluminescent element of substantially pure $^7$LiF and fourth thermoluminescent element of substantially pure $^6$LiF.

* * * * *